Aug. 12, 1941.  G. W. TEMPLE  2,252,532
COLLAPSIBLE TUBE MAKING MACHINE
Filed Sept. 21, 1939  2 Sheets-Sheet 1
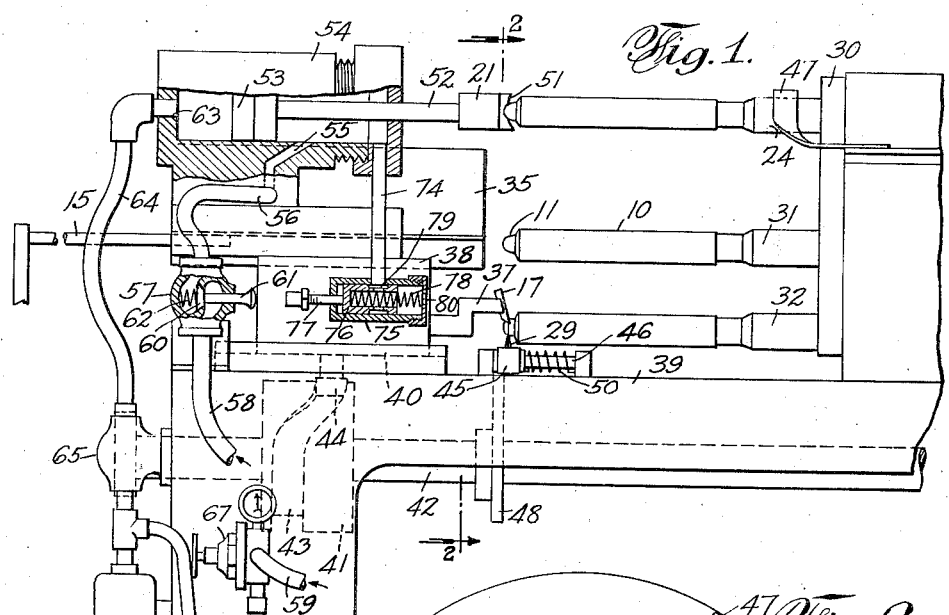
INVENTOR
George W. Temple
BY
Harry Jacobson
ATTORNEY Aug. 12, 1941.  G. W. TEMPLE  2,252,532
COLLAPSIBLE TUBE MAKING MACHINE
Filed Sept. 21, 1939   2 Sheets-Sheet 2
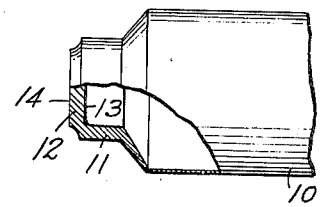
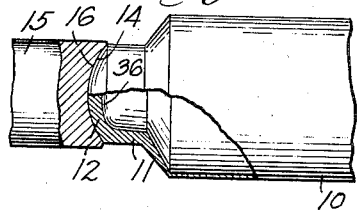
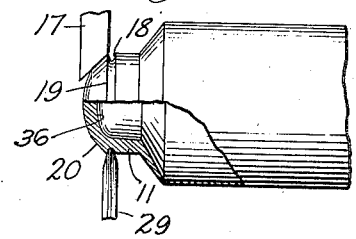
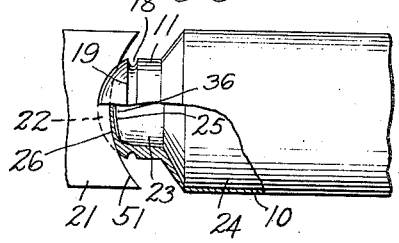
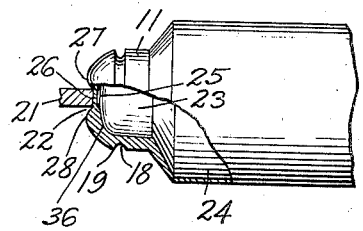
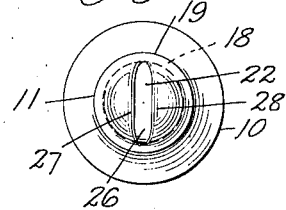
INVENTOR
George W. Temple
BY
Harry Jackson
ATTORNEY Patented Aug. 12, 1941

2,252,532

UNITED STATES PATENT OFFICE 2,252,532

COLLAPSIBLE TUBE MAKING MACHINE

George W. Temple, New York, N. Y., assignor to Victor Metal Products Corporation, Brooklyn, N. Y., a corporation of New York Application September 21, 1939, Serial No. 295,859

13 Claims. (Cl. 29—38)

This invention relates to collapsible-tube forming machines, to the collapsible tubes formed thereby, and to the method of making such tubes.

In manufacturing collapsible tubes designed for a single use, the tube is made with a thinned end closure portion comparable to a film of metal. Said film is readily rupturable by the finger or nail of the user to provide an opening in the neck end of the tube through which all of the contents of the tube may be discharged. Such tubes are shown, for example, in the patent to Harold F. Temple for Collapsible tube, No. 2,125,250, dated July 26, 1938.

Collapsible tubes are customarily formed from a small metal disc or slug by the extrusion process in a comparatively heavy press. The pressures required for extrusion of the disc into a tube are high and where a thinned portion is provided on the tube, high pressure is necessarily concentrated on a comparatively small area of the slug thereby putting excessive stresses upon the extruding dies forming said thinned portion. Such concentrated pressure easily damages the dies or so shortens their useful life as to make uneconomical the extrusion of finished single-use tubes in a press. Furthermore, owing to the pressures required, it is difficult to control with exactitude the thickness of the film or thinned portion of the single-use tube.

My invention therefore contemplates the provision of a machine for finishing the neck of the tube, which machine permits the accurate control of the thickness of the thinned portion of the tube and which finishes all the tubes uniformly and accurately without substantial variation, thereby avoiding the loss or damage which would result from the extrusion of the finished tubes in a press.

My invention further contemplates the provision of a machine for shaping, grooving and thinning the integral neck end of a tube to adapt the tube for a single use and to permit the tube to be easily gripped and handled manually when it becomes necessary to do so.

My invention further contemplates the provision of a simple and economical method for finishing the necks of tubes which have been extruded in a press.

My invention further contemplates the provision of a collapsible tube provided with a neck having a ready rupturable thinned portion produced by a groove or grooves therein, and with means on the neck whereby the tube may be readily gripped by the fingers and moved from place to place without danger of the fingers slipping.

The various objects of the invention will be clear from the description which follows and from the drawings, in which—

Fig. 1 is an elevational view partly in section of my improved machine.

Fig. 2 is a vertical section of the same taken on the line 2—2 of Fig. 1.

Fig. 3 is a vertical section of the main valve and of the operating means therefor.

Fig. 4 is a fragmentary elevational view partly in section of the tube as it appears after it has been extruded in the press ready to be transferred to the finishing machine.

Fig. 5 is a similar view of the same showing the first step in the finishing of the neck.

Fig. 6 is a similar view of the tube as it appears after the next operations wherein the neck of the tube has been beveled and grooved.

Fig. 7 is a similar view of the tube after the final operation thereon, the transverse groove having been made in the neck to thin the end wall of the neck of the tube along a predetermined area.

Fig. 8 is a top plan view and horizontal section of the same.

Fig. 9 is an end view of the finished tube.

In the practical embodiment of my invention which I have shown by way of example, and referring particularly to Figs. 4 to 9, inclusive, the unfinished capless collapsible tube designated generally by the numeral 10 is shown in Fig. 4 as it appears after it leaves the extrusion press. The neck 11 is provided with an end closure wall 12 having a flat inner surface 13 and a flat outer surface 14.

When the tube is mounted in the finishing machine later to be described, both surfaces 13 and 14 of the wall 12 are rounded by the pressure of a suitable mounting tool 15 having a concave end surface 16, as shown in Fig. 5.

The next step in finishing the tube consists of removing the surplus material of the wall 12 by means of a suitable beveling tool as 17 while the tube is rotated by the mandrel on which it is mounted. Simultaneously, the circumferential groove 18 is made intermediate the ends of the neck of the tube, the groove having a sharp edge as 19 destroying the smooth outer surface of the tube neck so that the neck may be gripped by the two fingers of an operator and drawn off the mandrel or otherwise manipulated for mounting the tube on or dismounting it from another machine such as the enamelling or decorating machine. Parts of the fingers of the operator enter the groove 18 and engage the edge 19 to prevent slipping of the fingers off the otherwise smooth and slippery tube neck thereby permitting the tube to be firmly gripped during the handling thereof.

The beveled surface 20 made by the tool 17 terminates at the sharp edge 19. To thin a selected part of the wall 12 along a substantial area so that the thinned part of the wall may easily be ruptured by the finger or nail of the user thereby to form an opening for the discharge of material from the tube, a suitable tool as 21 is employed. Said tool acts like a hammer to produce a groove 22 in the outermost surface of the tube neck by a hammering or swaging action and to thin the material of the tube to the required exact thickness. Owing to the sudden blow of the tool 21, the reaction of the tip 23 of the mandrel 24 on which the tube is mounted causes the material on the inner surface 13 of the wall 12 and opposite the groove 22 to move away from the groove and thereby to produce a slight outwardly extending groove 25 in said inner surface 13, the grooves 22 and 25 being opposite each other and on corresponding areas. There is thus left a thinned film of metal as 26 between the grooves 22 and 25. Said film 26 may easily be ruptured in the manner explained in connection with said Patent No. 2,125,250.

Since no neck-threading or tube-capping operations are necessary to complete the tube, the trimming of the end of the tube may be performed as a final step or as an intermediate step, if desired, and the tube dismounted from its mandrel ready for transfer to other machines such as the decorating and enameling machines for the completion of the tube ready for filling. It will be noted that the groove 22 is not sharp, but is provided with rounded side walls as 27 and 28 and with the circumferential groove 18 having a sharp edge 19 by means of which the tube neck can be gripped by two fingers of an operator and manipulated.

It will also be noted that if the action of the tool 21 is adequately controlled so as to give the same pressure or blow upon the tube neck for all tubes, the reaction groove 25 will be of an exact predetermined depth and the resultant closure film or wall 26 will also be of an exact thickness which can be accurately controlled without undue wear upon the operating parts or undue pressure thereon.

In carrying out the method above described, I prefer to use a trimming machine similar to that disclosed in the Reissue Patent No. 19,578 to Walter Prussing, dated May 21, 1935, for Automatic tube finishing and advancing machine. Said reissue patent discloses a finishing machine including a neck-threading means which is here unnecessary. In place of the threading tools, there are substituted in the present machine the beveling tool 17 and the grooving wheel 29. The neck trimming tool shown in said reissue patent is also replaced by the indenting tool 21 as will appear hereinafter.

Referring to Figs. 1, 2 and 3, wherein my improved machine is shown, the turret 30 is intermittently rotated in the same manner and by means substantially identical to that shown in said reissue patent. Said turret carries the mandrels 24, 31, 32, 33 and 34. The mandrels 31, 32 and 33 are rotated in one direction, the mandrel 34 being rotated in a reverse direction in the manner set forth in said reissue patent. However, the mandrel 24 is released of its rotating mechanism when it reaches the station in which the grooves 22 and 25 are formed and said mandrel 24 therefore is not permitted to rotate during the time the indenting tool 21 is operative.

Unfinished tubes as 10 being supplied to the tube chute 35, the lowermost tube of the row resting on said chute is mounted on the mandrel 31, while the turret 30 is at rest, by reciprocating mounting rod 15 in the manner and by the mechanism described in said reissue patent which mechanism need not, therefore, be further described. It should be noted, as has been hereinbefore indicated, that the inner end surface 16 of the mounting rod 15 is concave so that as the tube is pressed home on the mandrel, the outer surface 14 of the tube shown in Fig. 4 is made convex as is shown in Fig. 5. In other words, the surplus material of the wall 12 is redistributed to form the closing end wall of the tube and the outer surface 14 is given a convex shape. The tip 23 of the mandrel being provided with a convex end wall 36, the inner surface 13 of the wall 12 is also given its proper shape whereby the end wall 12 is partly finished by the mounting rod.

After the mounting of the tube on the mandrel 31 has been completed and the preliminary shaping of the wall 12 has been accomplished, the turret 30 continues its rotation, carrying the mandrel 31 into the position shown by the mandrel 32 in Figs. 1 and 2. In this position, the tool 17 and wheel 29 become operative to further finish the neck of the tube.

The tool 17 is carried by the arm 37 extending from the slide 38. Said slide is properly mounted for reciprocating movement in the bed 39 of the machine, being guided in the guide ways 40. Reciprocatory movement of the slide in the direction of the axis of the mandrel 32 is accurately controlled by suitable mechanism such as the grooved cam 41 mounted on the main shaft 42 and provided with a cam groove 43 which receives the cam roller 44 extending from the slide 38. Said cam groove 43 is of such dimensions and shape that the tool 17 is carried toward the mandrel 32 the exact distance required to accomplish its trimming function. The sharp cutting edge of the tool 17 forms the conical beveled surface 20 on the tube thereby trimming off the excess material at the juncture of the wall 12 with the cylindrical portion of the tube neck 11.

It will be understood that the mandrel 32 rotates during the beveling operation which is performed substantially simultaneously with the formation of the groove 18 by the grooving wheel 29. Said grooving wheel is sharpened and beveled on both of its faces so as to make the groove 18 of the proper width and depth and to create the sharp edge 19 at the outer termination of the groove and at the juncture of the beveled surface 20 with the wall of the groove.

The grooving wheel 29 is revolubly mounted on the lever 45 pivoted on the shaft 46. The cam 48 on the shaft 42 (Fig. 2) engages and operates the lever 45 to cause the wheel 29 to form the groove 18. The spring 50 on the pivot shaft 46 urges the lever 45 into contact with its cam and also urges the grooving wheel 29 normally away from the axis of the mandrel 32. When the turret 30 is at rest, rotation of the shaft 42 causes the cam 48 to rotate. Normally, that is, during the movement of the turret 30, the spring 50 swings the lever 45 in a direction to retract the grooving wheel away from the mandrel and the tube carried thereby. When the turret is at rest, however, the high part of the cam 48 becomes operative to swing the lever 45 the exact distance required to carry the grooving wheel against the tube neck and to form the groove 18.

It will be understood that as hereinbefore indicated, when the operator grasps the tube neck 11 with two fingers, parts of the fingers enter into the groove 18 and contact with the sharp edge 19 which acts as a frictional resistance to slipping of the fingers along the neck thereby permitting the operator to apply sufficient pressure upon the fingers to grasp the tube neck firmly in order that the tube may be manipulated as desired, that is, drawn off the mandrel of a decorating machine or mounted thereon or the like.

At the station represented by the mandrel 24, the mechanism for rotating the mandrel becomes inoperative and the mandrel does not rotate. To aid in maintaining the mandrel 24 at rest, a suitable brake as 47 is provided. Said brake is suitably mounted on the turret and is preferably lined with suitable friction material 49, the brake being sufficiently resilient to permit the mandrel to pass thereunder to be engaged and pressed thereby and halted against possible rotation and to pass by the brake on the continuation of the intermittent rotation of the turret. In the stationary position of the mandrel, the tool 21 becomes operative to indent and thin the wall 12 and thereby to provide the opposed grooves 22 and 25 in the end surface of the tube neck. The tool 21 is in the form of a plate, the thickness of which is of substantially the width of the groove and the width of which is greater than the length of the groove. The curvature of the operative concave edge 51 of the tool 21 corresponds to the curvature of the end surface of the mandrel tip 23 so that the film or thinned wall 26 is made of the desired shape by the hammer blow or swaging action of the tool.

Pneumatic means are provided for causing the tool to deliver a quick blow or hammer stroke upon the end surface 13 to produce the grooves 22 and 25. Said means comprises the piston rod 52 on one end of which the tool 21 is mounted and the other end of which carries the piston 53 operating in the cylinder 54. Said cylinder is suitably mounted on and is carried by the slide 38 for movement with said slide as a unit. Said cylinder is provided with a compressed air inlet port 55 delivering compressed air to one side of the piston at the proper time, said port being connected by the flexible pipe 56 with the fixed valve 57. Compressed air is delivered to the valve 57 by the pipe 58 receiving said compressed air from a suitable source such as the inlet pipe 59 by a connection not shown. The valve head 60 carried an extension rod 61 projecting outside of the valve and is normally urged by the spring 62 against its seat to close the valve.

Compressed air is admitted on the other side of the piston 53 at the proper time through the port 63, the flexible pipe 64 and the valve 65. Said valve communicates with the accumulator tank 66 into which air is admitted from the inlet pipe 59 through the control valve 67 and the pipe 68, so that air at a constant predetermined pressure is at all times supplied to the valve 65. It is advisable that the pressure on the piston 53 operative to produce the grooving action of the tool 21 be maintained constant with a set accuracy so that a uniform blow is applied to the tube neck to produce the grooving action of the tool 21 whereby the thickness of the wall 26 may be predetermined with great accuracy and within the desired limits. In the position of the parts shown in Fig. 1, in which the grooving tool 21 has completed its grooving stroke, the valve 65 has been opened mechanically by suitable means and air has been admitted to the left side of the piston 53.

As shown in Fig. 3, the valve head 69 carries the stem 70 which is adapted to be engaged by the lever 71 to remove the valve head from its seat against the action of the spring 72 and thereby to open the valve. The lever 71 is in turn operated at the proper time by the cam 73 on the main shaft 42. Normally, the spring 72 is operative to close the valve since the high part of the cam 73 is out of the way of the lever 71 which normally rests on the low part of the cam.

It will be understood that as compressed air is admitted to the left side of the piston, the air on the right side of the piston is exhausted. The means provided for this purpose consists of the pipe 74 connecting the right end of the cylinder 54 with the valve cylinder 75, which valve cylinder is mounted on the slide 38 and moves therewith. The piston 76 reciprocating within the cylinder 75 is provided with the stem 77 extending toward the stem 61 to open the valve 57 at the proper time. Said piston 76 is normally spring pressed by the spring 78 into a position whereby the pipe 74 communicates with the opening 79 of the piston 76 and therethrough communicates with the inside of the cylinder and with the exhaust port 80 at the end of the cylinder. In this position of the parts, the air at the right side of the cylinder 54 is exhausted through the pipe 74, and the openings 79 and 80.

It will be understood that when the turret 30 is at rest, the slide 38 which has been previously retracted by the cam 41, is advanced by said cam toward the mandrels to bring the beveling tool 17 and the grooving wheel 29 into operation and also to begin the movement of the tool 21 toward the mandrel. As the slide moves toward the mandrel, air to the right of the piston 53 is exhausted and the cam 73 becomes operative to open the valve 65 and to admit air at the required pressure into the cylinder at the left of the piston 53, the valve 57 being closed at this time. The admission of air under pressure into the cylinder causes the piston 53 to move suddenly toward the right thereby moving the tool 21 quickly against the tube neck to produce a hammer blow upon said neck and to effect the formation of the groove 22.

The quick blow upon the tube neck which results in the formation of the groove 22 also results in the formation of the opposed groove 25 through the reaction pressure upon the wall 12 which causes the material of said wall to move sidewise away from the tool 21. The film or wall 26 is thereby formed of the exact predetermined thickness and shape. After the movement of the tool 21 toward the right has been accomplished, and the remaining operations upon the tubes of the various mandrels have been completed, the slide 38 begins its return movement toward the left under the action of the cam 41.

The tool 21, however, remains in contact with the tube neck until the stem 77 of the valve 75 is moved by the slide into contact with the stem 61 of the valve 57. When this occurs, the valve 57 is opened and the piston 76 is moved toward the right against the action of the spring 78, thereby closing off the opening 79. Air, consequently, is admitted to the port 55 on the right-hand side of the piston 53 causing said piston to move toward the left and to withdraw the tool 21 suddenly from the neck, the air in the cylinder 54 on the left of the piston being forced back through the valve 65 and dissipated to the atmosphere. After the slide 38 has been retracted, the turret 30 is given its next intermittent movement and the operation is repeated.

When the thus finished tube reaches the position shown by the mandrel 34, the tube is dismounted by the dismounting arm 81 in a manner described in said reissue patent.

It will be seen that from the above, I have provided a machine for accurately controlling the shape and dimensions of the neck of the finished tube and for finishing the tube; that I have also provided a new tube adapted for a single use and having already rupturable and thinned closure wall or film; that the tube may readily be handled by its neck without danger of slippage and that I have provided a novel method for the accurate manufacture of said tubes within the required limits.

While I have shown and described certain specific embodiments of my invention, I do not wish to be understood as limiting myself thereto, but intend to claim the invention as broadly as may be permitted by the state of the prior art and the scope of the appended claims.

I claim:

1. In a finishing machine for collapsible tubes having closed necks, a mandrel, means for mounting a tube on the mandrel and for simultaneously shaping the outer surface of the neck end of the tube, a grooving wheel, and means for exerting a sudden blow on said neck end to thin a predetermined area of said end to a predetermined extent.

2. In a finishing machine for collapsible tubes having closed necks, pneumatically operated reciprocating means for exerting a sudden blow of predetermined force on the neck end of the tube to thin a selected area of said end comprising a thinning tool, a piston connected to said tool, a cylinder for the piston and means for admitting fluid under pressure alternately on either side of the piston.

3. In a finishing machine for collapsible tubes having closed necks, a mandrel, means for mounting a tube on the mandrel and for also shaping the neck end of the tube, means for grooving said neck end, and means responsive to fluid under pressure to thin a selected area of said neck end.

4. In a finishing machine for collapsible tubes having closed necks, means for making a circumferential groove in the neck end of a tube, and hammer means responsive to fluid under pressure to thin a selected area of said neck end to a predetermined extent.

5. In a finishing machine for collapsible tubes having closed necks, means for thinning a selected area of the neck end of a tube to a predetermined extent comprising a hammer, and fluid pressure operated means for reciprocating said hammer.

6. In a finishing machine for collapsible tubes having closed necks, a hammer having a concave operating edge, and means responsive to fluid under pressure for operating said hammer to exert a blow of predetermined force upon the neck end of a tube.

7. In a finishing machine for collapsible tubes having closed necks, a rotatable mandrel for a tube, means for mounting a tube on the mandrel and for also shaping the neck end of the tube, a grooving wheel, and means for moving the wheel toward and from the mandrel to carry the wheel into contact with a tube on the mandrel while the mandrel is rotating and thereby to groove the tube.

8. The method of finishing the neck of a collapsible tube comprising shaping the outer surface of the neck, trimming the shaped surface while simultaneously grooving the neck to produce a mutilated surface adapted to be gripped by the fingers without slippage, and exerting a single hammer blow of predetermined force on a selected area of said outer surface to thin the end of the neck to a predetermined extent.

9. The method of thinning the neck end of a collapsible tube comprising suddenly moving a hammer by a predetermined fluid pressure to deliver a single blow of predetermined force upon a selected area of the neck end while the tube and said neck end are supported.

10. The method of thinning the neck of a collapsible tube comprising exerting a single hammer blow upon the end of the neck while the neck is supported by the tip of a mandrel to produce simultaneously an external and an opposed internal groove in said neck end.

11. In a finishing machine for collapsible tubes having closed necks, a hammer, and means for operating the hammer to exert a blow of predetermined force upon the neck end of a tube to thin said end.

12. In a finishing machine for collapsible tubes having closed necks, a mandrel, means for mounting a tube on the mandrel, and means including a hammer for exerting a sudden blow on the neck end of the tube to thin a predetermined portion of the area of said end to a predetermined extent.

13. In a finishing machine for collapsible tubes having closed necks, a mandrel, and hammer means cooperating with the mandrel to deliver a single blow upon the neck of a tube mounted on the mandrel to thin a selected area of said neck end.

GEORGE W. TEMPLE.